United States Patent
Puskas

[19]

[11] Patent Number: 5,839,695
[45] Date of Patent: Nov. 24, 1998

[54] CRUCIFORM PARACHUTE DESIGN

[75] Inventor: Elek Puskas, Mt. Holly, N.J.

[73] Assignee: Para-Flite, Inc., Pennsauken, N.J.

[21] Appl. No.: 650,946

[22] Filed: May 20, 1996

[51] Int. Cl.⁶ .................................................. B64D 17/02
[52] U.S. Cl. .......................................... 244/145; 244/142
[58] Field of Search ................................... 244/145, 142, 244/152, 138 R

[56] References Cited

U.S. PATENT DOCUMENTS

| | | | |
|---|---|---|---|
| 2,404,672 | 7/1946 | Volf | 244/142 |
| 2,734,706 | 2/1956 | Jalbert | 244/145 |
| 2,745,615 | 5/1956 | Fogal | 244/145 |
| 2,770,432 | 11/1956 | Stevinson | 244/145 |
| 2,997,263 | 8/1961 | Forichon | 244/145 |
| 3,073,555 | 1/1963 | Barish | 244/145 |
| 3,298,639 | 1/1967 | Heinrich et al. | 244/145 |
| 3,331,573 | 7/1967 | Winker et al. | 244/145 |
| 3,474,990 | 10/1969 | Flatau | 244/152 |
| 3,504,874 | 4/1970 | Lemoigne | 244/143 |
| 3,531,067 | 9/1970 | Mitchell | 244/145 |
| 3,559,931 | 2/1971 | Pohl | 244/145 |
| 3,602,462 | 8/1971 | Slater et al. | 244/145 |
| 3,741,505 | 6/1973 | Engel | 244/145 |
| 3,809,342 | 5/1974 | Lemoigne | 244/145 |
| 4,834,323 | 5/1989 | Reuter | 244/145 |

FOREIGN PATENT DOCUMENTS 27 06 006  8/1978  Germany .

Primary Examiner—Robert J. Oberleitner
Assistant Examiner—Tien Dinh
Attorney, Agent, or Firm—Jacobson, Price, Holman & Stern, PLLC

[57] ABSTRACT

An improved cruciform or cross parachute, especially for personnel use, is disclosed. The central section and canopy arms are made from a zero or near zero porosity fabric, and air from underneath the canopy is vented as air venting jets through generally horizontal openings in each of the four lateral arms of the canopy. The generally horizontal openings are centrally located in the upper half of the lateral arms, preferably spaced inwardly 20% of the arm width from the arm edges and preferably at a transition point in the upper part of the arm where a tangent line intersecting the arm surface is approximately 45° from the vertical axis of the parachute. Also, preferably, the opening is formed by horizontal slits. The central section can be made from the standard square crown configuration or, alternatively, effectively enlarged by removing small triangular sections at each of the four corners of the otherwise square crown. The lateral arms have a relative short length, preferably less than 75% of the crown width. The suspension lines are also relatively short, preferably, 40%–70% of the canopy cross panel length. The canopy central section and lateral arms, and the air vent jet opening leading edges, are all reinforced using conventional reinforcing tapes.

20 Claims, 4 Drawing Sheets

CRUCIFORM PARACHUTE DESIGN

FIELD OF THE INVENTION

This invention relates in general to parachutes and more specifically to cruciform or cross parachute and canopy constructions therefor.

DESCRIPTION OF THE PRIOR ART

There are several general parachute designs which have been known for many years whereby personnel and cargo can be deployed from airborne aircraft to safely descend to a desired drop zone. The most well known design, of course, is the conventional canopy of generally hemispherical shape, with the shroud lines or suspension lines connected around the lower edge of the canopy. A second general form of parachute is known as the ram air type which includes upper and lower surfaces interconnected by substantially vertical dividing panels to form an airfoil shape with the leading edge open to allow air to enter and pressurize the space between the surfaces. The suspension lines are normally connected to the bottom surface at the dividing panels and through reinforcing tapes to the upper surface. A third general type of parachute is the cruciform or cross parachute in which the canopy includes a crown or center section of generally square shape with four wings or arms attached to each of the four sides of the square center section and extending laterally therefrom. The uppermost edge of each lateral arm has a width which corresponds to the length of the adjacent side of the central square to which it is attached.

Originally, cruciform parachutes were commonly made by laying two fabric panels across one another at right angles and joining them in a cross pattern such as when placed flat on the floor forming a cross symbol. Hence, the center section was made of a double layer. Examples of more modern cruciform or cross parachutes are shown in the prior art, such as in U.S. Pat. Nos. 3,331,573, 3,531,067, 3,559,931, 3,741,505 and 4,834,323.

Because of their simple geometric configuration, parachutes having a cruciform or cross design are notable for their simplicity in construction and therefore low cost. A major drawback of the cruciform parachute configuration, however, is the relatively large pendulum oscillation about the vertical, on the order of 10° to 15°, and other stability problems associated with this design. Thus, it is virtually impossible to ensure a desired vertical decent. For the same reason, the oscillation and instability associated with cruciform parachutes make them particularly undesirable for personnel use. Hence, cruciform parachutes have seldom been used for personnel deployment. Accordingly, cruciform parachutes have heretofore been used primarily for non-critical cargo delivery applications and the like, especially in cases when the parachute cannot be recovered.

Generally, efforts to overcome the oscillation and instability problems of cruciform parachutes have focused on extending the length of the arms to a length substantially greater than their width, and to extending the length of the suspension lines. As the length of the arms is increased, stability increases as does the drag coefficient. Just like lengthening the arms, lengthening the suspension lines increases stability and increases the drag coefficient. Extending the length of the arms and/or the length of the suspension lines in cruciform parachutes, while improving stability and efficiency, has some drawbacks. The most significant of these drawbacks are excess weight, bulk, and cost, and the longer time constant of pendulum motion. In other words, even though the longer arms and/or lines increase static stability, once the payload is displaced relative to the canopy, such as might be the case when encountering atmospheric turbulence, the excursions tend to be much larger and require longer time periods to dampen out.

German Patent No. 2,706,006 attempts to overcome this problem of oscillation by providing open slots between the top edge of the wings, or arms, and the adjacent edge of the crown, or center section, across the entire length of the edge. The arms are thus attached to the crown by reinforcing tapes. According to this design, the slots have a minimum width of 10 millimeters, and "geometric porosity" of no less than 1.8% and no more than 2.5%. A geometric porosity of 2.0% is preferred. Geometric porosity is an expression of the total area of holes or gaps formed in the fabric as a percentage of the total cloth area. Thus, if fabric is removed, then the area of the removed fabric as a percentage of the total cloth area of the canopy establishes the geometric porosity.

Furthermore, the rate of decent of a parachute can be decreased by using cloth which has zero, or near zero, porosity. Such low porosity materials have been used in parachute design, especially in parachutes of the ram air type. However, as the porosity/permeability of the canopy fabric is decreased, stability is also decreased, and other problems such as opening shock are encountered. Thus, it has not been previously possible to utilize zero or near zero porosity materials in cruciform parachutes because the use of such materials increases the already unacceptable instability and oscillation of cruciform parachute designs.

By varying the dimensions of the panels, lines and canopy materials, those skilled in the art have previously run into the limitations of the cruciform design, and guidelines have been established for the variables to keep from running into difficulties. Typically, therefore, cruciform parachute designs have utilized canopy fabric materials with porosities greater than 40 standard cubic feet per minute ("SCFM") per square foot at ½ inch water pressure. Similarly, arm lengths in the cruciform parachute design are typically 1 to 1½ times the length of the edge of the square central section, and suspension line lengths are also generally 1 to 1½ times the entire length of each of the two cross panels, tip-to-tip, as measured flat on the ground.

SUMMARY OF THE INVENTION

The primary purpose of the present invention is to overcome problems associated with the prior cruciform or cross parachutes and provide an improved cruciform parachute made of zero, or near zero, porosity material which overcomes the stability and oscillation problems that previously plagued this type of parachute design.

In accordance with the present invention, stability is restored to a parachute of the cruciform or cross design, while using zero or near zero porosity material, by providing air venting jets through appropriate openings placed at selected locations in the wing or arm portions of the parachute canopy. The openings forming the air venting jets are generally horizontally elongated openings located in each of the four wings or arms of the canopy near where a tangent line which intersects the canopy surface forming the arms approaches a 45° angle with the vertical axis of the parachute. This transition point is normally 15% to 30% of the arm length from the point where the arms attach to the crown.

Further, it has been found that the openings for the air venting jets are best arranged to provide maximum venting in the central portion of the canopy arms rather than their side edges to provide better air propulsion from the venting jets. In addition, it has been determined that horizontal slits cut in the selected location of the arms, i.e., openings having essentially 0% geometric porosity, provide the best opening for the venting jets.

The size of the generally square crown or central portion of the canopy, the length of the lateral arms and the length of the suspension lines can then be designed so as to provide desired stability and rate of decent using the zero or near zero, porosity material for personnel use of the parachute. In accordance with the present invention, it has been discovered that shorter arms length and shorter suspension lines length can be used than in conventional prior cross parachute designs, without sacrificing stability, thus improving the bulk and cost of the parachute.

In an alternate embodiment of the present invention, it has been found that when using zero or near zero porosity fabric for the cruciform parachute, or at least the crown portion thereof, it may be desirable to enlarge the crown of the parachute by removing a small triangular section in each corner adjacent to where each side of the crown connects to the top of each wing or arm. Since most of the drag in the cruciform configuration is produced in the square center section, enlarging the crown or center section without changing the size of the arms or wings, increases the drag of the canopy and, therefore, reduces the rate of descent.

It is therefore a primary object of the present invention to provide a parachute of the cruciform or cross configuration type which is especially designed for personnel use.

It is a further primary object of the present invention to provide a cruciform or cross configuration parachute wherein the canopy, especially the crown or center section, is constructed of a zero, or near zero, porosity fabric or material.

It is a yet further principal object of the present invention to provide such a cruciform parachute made from zero or near zero porosity fabric which has increased stability and reduced oscillation, not heretofore available in such parachutes.

It is another object of the present invention to provide a cruciform parachute which achieves the foregoing objects by providing air venting jets or openings through the lateral arm or wing portions of the canopy that would otherwise be solid. In their preferred form, the openings are made by forming horizontal slits (approximately 0t geometric porosity) in the upper central portion of the arms, near where the arms attach to the edge of the square center crown of the canopy.

It is yet another object of the present invention to provide a cruciform parachute wherein canopy sizes of from twenty up to sixty feet in diameter, when fully deployed, are capable of usage for air delivery of personnel.

It is a further object of the present invention to provide a cruciform parachute wherein canopy sizes of from 6 inches to 15 feet in diameter are capable of usage for the air delivery of payloads such as weapons and detection devices such as antitank mines and the like.

It is a still further object of the present invention to provide a cruciform parachute wherein usage with air delivery craft having higher air speed is possible without decreasing the stability of the delivery parachute.

Yet another object of the present invention is to provide a cruciform type parachute made of zero, or near zero, porosity fabric which has a higher drag by enlarging the crown or center section of the parachute without widening the top of each wing.

Further still, it is another object of the present invention to provide cruciform parachute configurations wherein the cost of manufacture and bulk are maintained extremely low, by reducing the arm and suspension line length in relation to the crown or center section.

The above and other objects and advantages which will become subsequently apparent reside in the details of construction as more fully hereinafter described and claimed, reference being made to the accompanying drawings forming a part hereof, wherein like numerals refer to like parts throughout.

BRIEF DESCRIPTION OF DRAWINGS OF PREFERRED EMBODIMENTS

DESCRIPTION OF THE PREFERRED EMBODIMENTS

Figure 1:
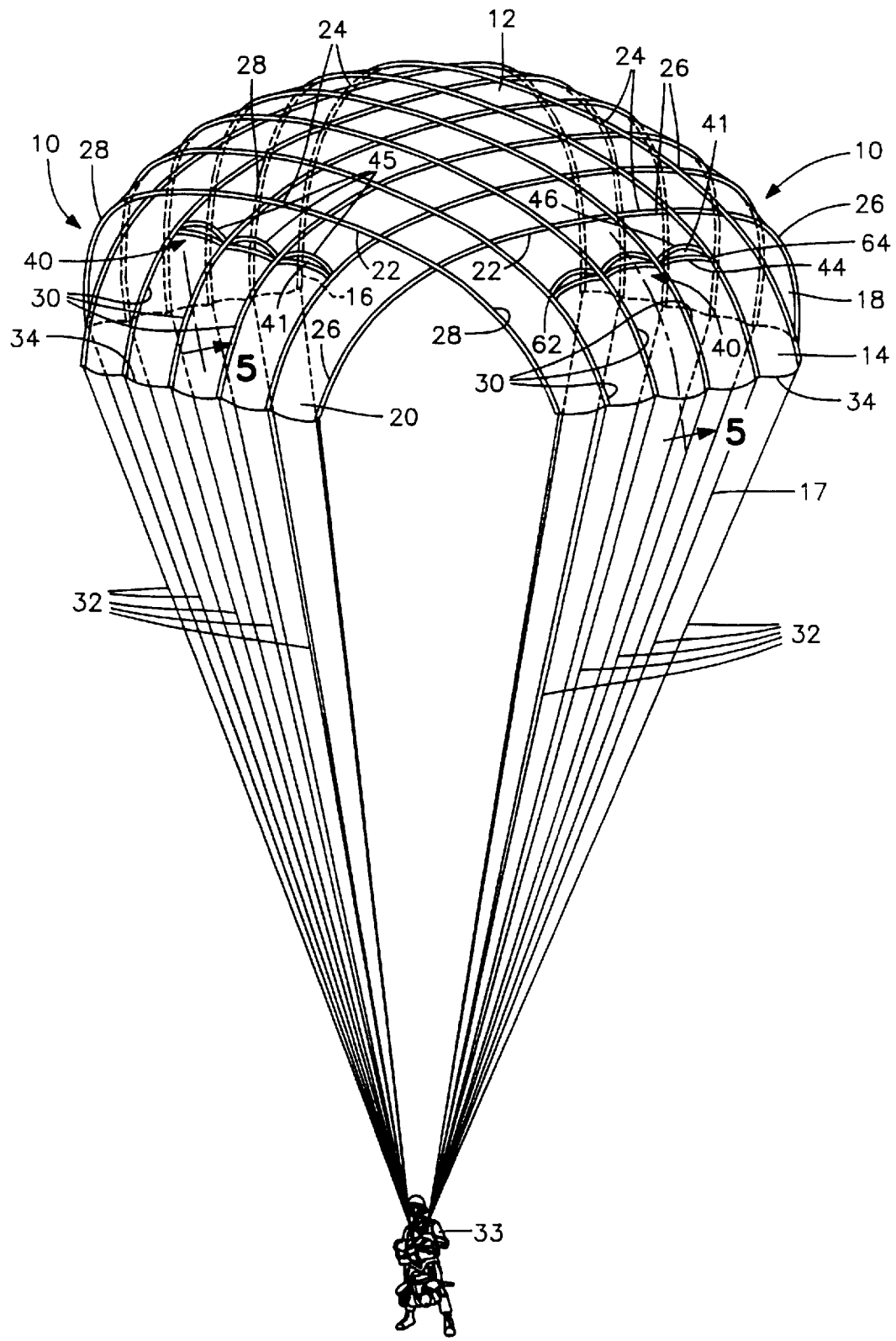
FIG. 1 is a perspective view of a deployed cruciform parachute constructed in accordance with the preferred design of the present invention for personnel use.

In describing the preferred embodiments of the invention as illustrated in the drawings, and otherwise as described, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in the drawings, the parachute of this invention has a canopy 10 of cruciform or cross shape and includes a substantially square crown or central section 12 and four laterally extending wings or arms 14, 16, 18 and 20. Each lateral arm is attached at its uppermost edge 22 to one side edge 24 of the crown 12, preferably with edge reinforcing tapes 26 which extend continuously along the seam between edges 22 and 24 and along the edge of adjacent arms. Thus, as shown in the drawings, edge reinforcing tape 26 extends from the tip of arm 20 continuously along its edge across the seam between edge 22 and 24 and then continuously along the edge of arm 18 to its outermost tip. Similarly, edge reinforcing tape 28 extends from the outer tip of arm 14 along its edge through the seam between edge 22 of arm 20 and edge 24 of central section 12 and then across along the outer edge of arm 16. Internal reinforcing tapes 30, or the like, extend continuously across the arms and the crown to further reinforce the canopy. The reinforcing tapes 26, 28 and 30 of the present invention are of conventional design well known in the parachute art.

Suspension lines 32 are attached at their uppermost ends to the canopy at the outer or lowermost edges 34 of the arms 14, 16, 18 and 20 at the location of the reinforcing tapes 26, 28 and 30 by any suitable connection, such as by forming loops in the ends of the reinforcing tapes in a known manner.

The lowermost ends of the suspension lines 32 are then connected to the parachutist 33 through any suitable rigging in known conventional equipment.

In accordance with the present invention, canopy 10, including crown section 12 and arms 14, 16, 18 and 20, are made from a zero, or near zero, porosity fabric. Preferably, fabrics that have a permeability of less than 5 SCFM/square foot at ½ inch of water pressure are best suited for the present invention. While the fabric for the crown 12 and arms 14, 16, 18 and 20 may be of the same material, it is preferred that the crown 12 be made from a zero porosity fabric and the arms made from an ultra low permeability fabric. A conventional zero porosity fabric for parachutes is coated with a mixture of polyurethane and silicone and readily available commercially from parachute fabric suppliers, such as the "Soar Coat" fabric sold by Performance Textiles of Greensboro, N. C.. The specification for the Performance Textiles "Soar Coat" zero porosity fabric states that it has zero porosity at a differential pressure of 10 inches of water column. A fabric suitable for the arms of the present invention is referred to as the "F-111" type and is presently available from several sources, including Performance Textiles, and Brookwood Companies, Inc. of New York, N. Y. It is defined in U.S. military specifications, MIL-SPEC MIL-C-44378. The F-111 type fabric is specified to have a permeability between zero to 5 SCFM at ½ inch water pressure.

Figure 2:
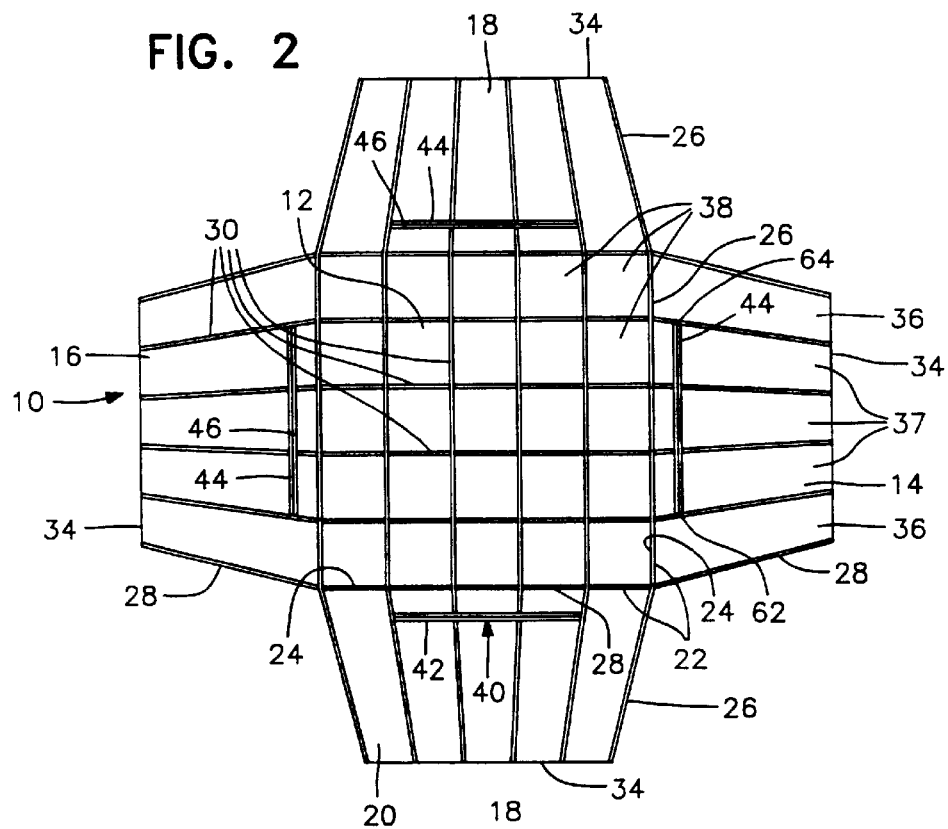
FIG. 2 is a plan view of the canopy of FIG. 1 laying flat, without suspension lines attached.

In the preferred form of the invention as shown in FIGS. 1 and 2 of the drawings, internal and external reinforcing tapes 26, 28 and 30 divide each arm 14, 16, 18 and 20 into five elongated panel sections, two side edge panels 36 and three interior panels 37. Similarly, tapes 26, 28 and 30 divide the generally square crown central section into twenty-five approximately equal, generally square panel sections 38. As shown in FIG. 2, panels 36 and 37 of arms 14, 16, 18 and 20 are all tapered along their length toward their outer edge 34. By this configuration excess fabric can be eliminated and the design of the arms with reinforcing tapes matches the convergence of the suspension lines to a common confluence point.

While division of each arm into five elongated panel sections is preferred, this feature should in no way be limiting for the present invention since fewer or more panel sections can be built into the parachute of this invention by utilizing additional internal reinforcing tapes 30 or the like. The number of reinforcing tapes 30 and interior panel sections 37 depends in great part on the size of the parachute, the reinforcement desired and the number of suspension lines and suspension line attachment points to be built into the canopy. The same applies to the number of generally square panel sections 38 for crown 12. While it is preferred that the crown or center section 12 be constructed of a single piece of fabric, divided into sections 38 by reinforcing tapes 30, it is possible to form crown 12 by stitching individual panel sections 38 together, using reinforcing tape in a known manner. Further, while definitely not preferred, it may be possible to use more or less internal reinforcing tapes 30 in one direction, with less or more reinforcing tapes in the other direction, without departing from the present invention.

Figure 5:
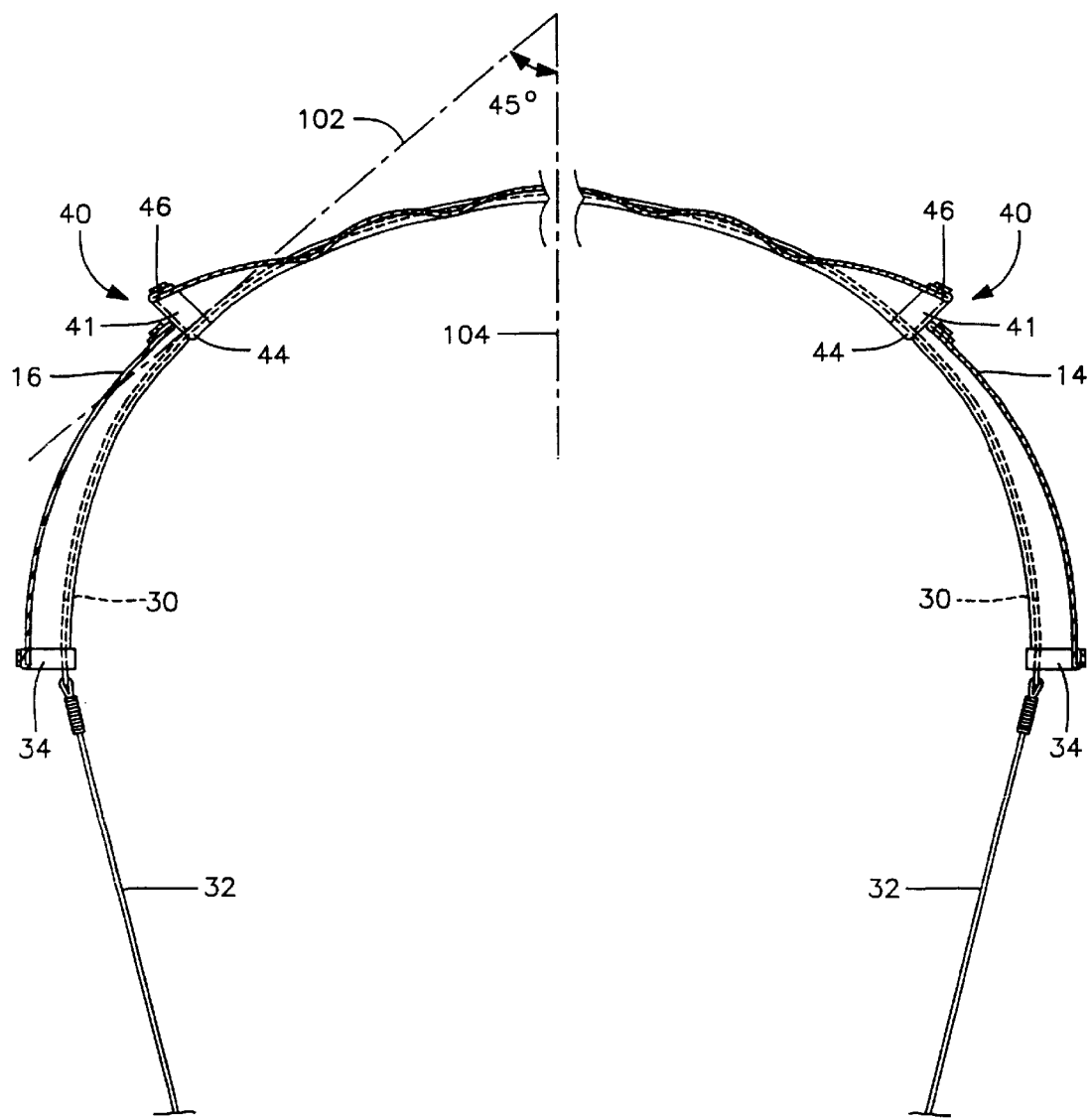
FIG. 5 is a cross-sectional view taken along line 5—5 of FIG. 1, showing the preferred location for the air venting jets.

Since the present invention utilizes zero or near zero porosity fabric, the drag coefficient and, therefore, the efficiency of the canopy is increased since there is less venting through the fabric. To overcome the negative effects of the zero, or near zero, fabric permeability, mainly loss in stability, a unique air venting jet system is provided in each canopy arm 14, 16, 18 and 20. More specifically, air venting jets generally designated by the numeral 40 are built into each canopy arm 14, 16, 18 and 20. The air venting jets 40 are provided by generally horizontal openings 41 in the upper portion of each arm near its interconnection to the adjacent side edge of the square center section. In their preferred form, the air venting jets are formed by slits 42. The slits 42 are preferably reinforced along their leading edges by reinforcing tapes 44 and 46, or the like, which are connected at their ends and intersect with internal reinforcing tapes 30, such as at 45, thus forming a series of side-by-side openings 41 (as shown in FIG. 1). In this preferred form of the invention, as shown in FIGS. 1, 2 and 5, the canopy exhibits a zero percent geometric porosity because no fabric has been removed in forming slits 42. However, slits 42 provide an air jet opening when the canopy is inflated during deployment.

As shown in FIG. 5, the air jet vents 42 are most preferably positioned on arms 14, 16, 18 and 20 at the location where a line 102, which is tangent to the surface of the arm, such as arm 16, approaches a 450 angle with the vertical axis 104 of the parachute. In most cruciform designs in accordance with the present invention, this transition point is 15% to 30% of the arm length from the edge 22.

Figure 4:
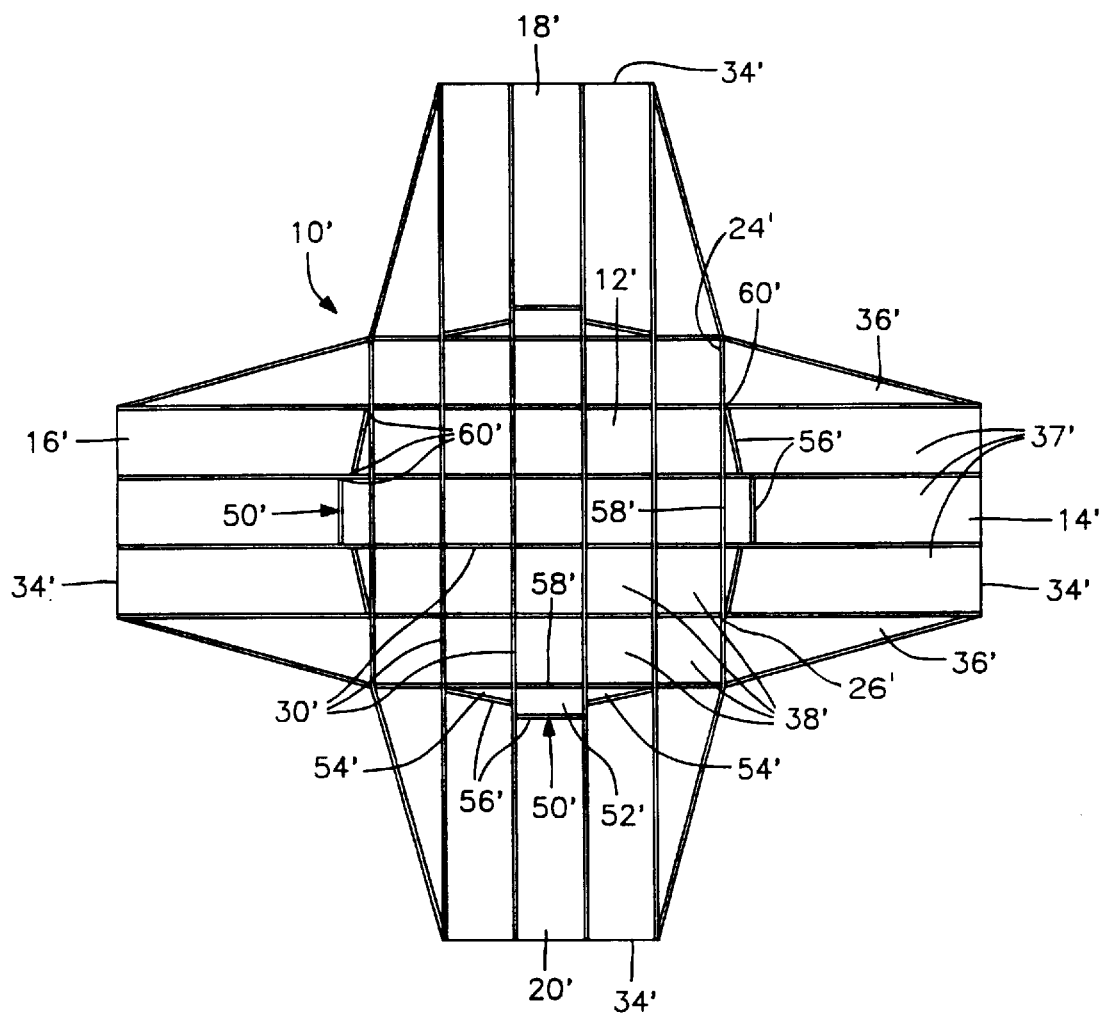
FIG. 4 is a plan view of yet another canopy configuration embodying the feature of the present invention, again without suspension lines shown.

While slits, without removing any fabric from the internal panels 37 of each arm, are clearly preferred for forming the air jet vents 42, it may be possible to form the air vent system 40 by cutting holes or slots that have a measurable area, as shown in FIG. 4. Preferably, the air vent system is located in the internal panels 37, and not in side panels 36, so as to not extend across the full width of the lateral arms. However, when the air venting jets are slits, as preferred, it is possible that they extend into and across side panels 36 to edge reinforcing tapes 26 and 28 along the edges of lateral arms 14, 16, 18 and 20.

Typical dimensions for the components of a parachute manufactured in accordance with the present invention as shown in FIGS. 1 and 2, with manufacturing tolerances within plus or minus 2%, are as follows. Each side 24 of crown 12 measures 242.5 inches, thus making each substantially square panel section 38 of crown 12 about 48.5 inches on each side, and the area of the crown approximately 408 square feet. The length of the uppermost edge 26 of canopy arms 14, 16, 18 and 20 is therefore also 242.5 inches, and the uppermost edge 22 of each panel 36 and 37 about 48.5inches. The length of each canopy arm from the uppermost edge 22 to the lowermost edge 34 is 110 inches, or approximately 45% of side 24, and each panel 36 and 37 is reduced in width from 48.5inches to 36 inches along its lowermost edge 34. Slots 42 are positioned 24 inches away from the uppermost edges 22 of the canopy arm. Finally, suspension lines 32 are approximately 285 inches in length, or approximately 61.6% of the canopy cross panel length.

Figure 3:
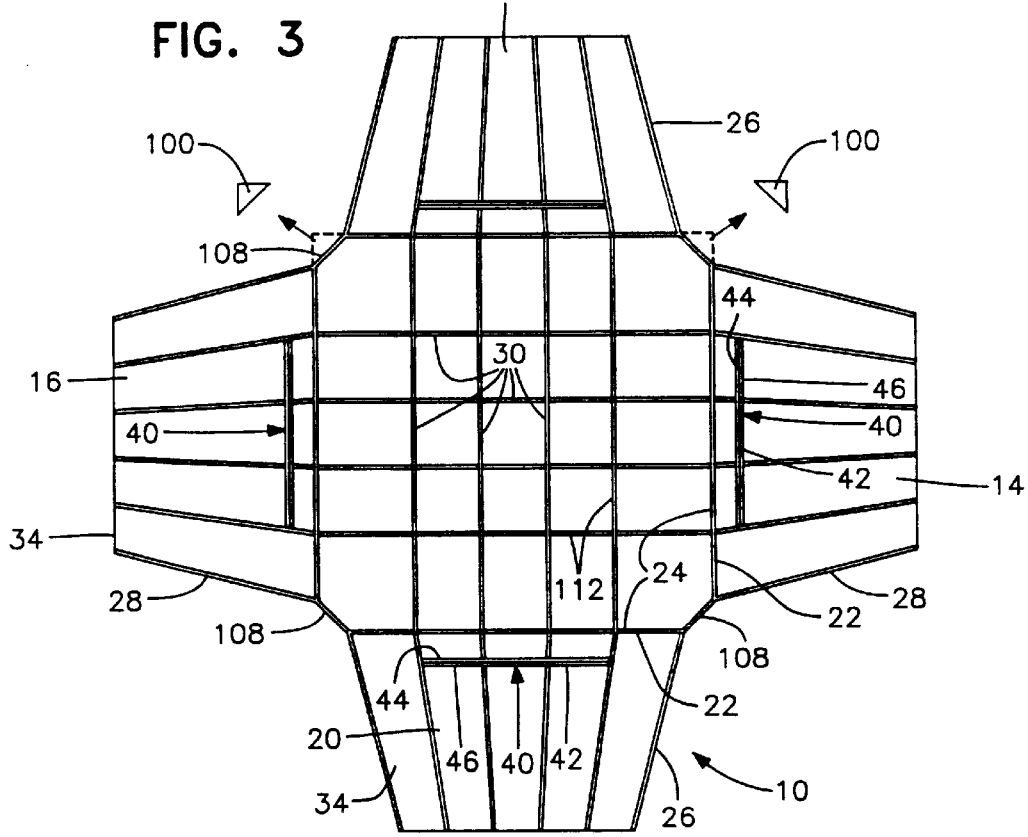
FIG. 3 is a plan view of an alternate canopy configuration embodying an enlarged crown or center section in accordance with the present invention, without suspension lines attached.

An alternate canopy configuration in accordance with the present invention is shown in FIG. 3 where like numerals are used to identify the same components described above for canopy 10 as shown in FIG. 2. The major difference in the canopy configurations is the enlargement of crown 12 adjacent the uppermost edges 22 of arms 14, 16, 18 and 20 by removal of the triangular corners, designated by the numeral 100. Thus, the crown 12 is tapered at its corner edges, as at 108, to accommodate the greater effective length of each side edge 24 with respect to the uppermost edge 22 of the arms 14, 16, 18 and 20. The enlarged crown has a width which is no greater than 140% of the length of the uppermost edges 22 of the arms, and preferably in the range of about 120%.

In the configuration as shown in FIG. 3, air vent jets 40 are also formed by generally horizontal slits 42, preferably reinforced along their leading edge by reinforcing tapes 44 and 46, or the like, in a known manner. Reinforcing tapes 44 and 46 are connected at their ends and intersect with reinforcing tapes 30, such as at 45, thus forming a series (three) of side-by-side openings 41 (as shown in FIG. 1). Again, preferably, slits 42 terminate short of the side edges of arms 14, 16, 18 and 20.

It has been found that the canopy configuration of FIG. 3 produces a cruciform parachute with a higher drag and thus a slower rate of descent than prior known designs, especially when made with zero, or near zero, porosity fabric and utilizing the air vent jets 40 in accordance with the present invention. Because most of the drag in a cruciform parachute is produced in the crown or center section, effectively enlarging the crown section increases drag and reduces rate of descent.

Typical dimensions for a parachute manufactured in accordance with the present invention as shown in FIG. 3, with manufacturing tolerances within plus or minus 2%, are as follows. The crosswidth of crown 12 measures 298 inches. Removed triangular sections 100 are generally isosceles triangles, 24 inches on each of the equal sides, thus crown 12 is approximately 609 square feet when lying flat. The length of the uppermost edges 22 of canopy arms 14, 16, 18 and 20 is 250 inches, and the uppermost edge 22 of each panel 36 and 37 is, therefore, about 50 inches. The length of each canopy arm from the uppermost edge 22 to the lowermost edge 34 is 132 inches, or approximately 44% of the crown crosswidth. Each panel 36 and 37 is reduced in width from 50 inches to about 36 inches along their lowermost edge 34. Slots 42 are positioned 24 inches away from the uppermost edge 22 of the canopy arms. Finally, suspension lines 32 are 285 inches in length, or approximately 51% of the canopy cross panel length, tip-to-tip.

Turning now to FIG. 4, it shows an alternate canopy construction 10 in accordance with the present invention. In this configuration, the crown or center section 12' and the lateral arms 14', 16', 18' and 20', and the fabric materials for the crown 12' and arms 14' 16', 18' and 20', are the same as described previously for the preferred configuration as shown in FIGS. 1 and 2. The differences relate to the configuration of the panels 36' and 37' of the arms and an alternate opening configuration generally designated by the number 50' for the air venting jets. More specifically, internal panels 37' of the arms are generally rectangular in shape, rather than tapered, as shown in the FIG. 4 configuration, and end panels 36' are triangular in shape, to effect the desired tapering of the arms from their attachment to crown 12' to their outer edges 34'. This configuration for the arms 14', 16', 18' and 20' has the advantage of ease of manufacture of the arms over the configurations shown in FIGS. 2 and 3.

In the configuration of FIG. 4, the air venting jets 50' comprise a series of openings across the center width of the lateral arms with the central opening 52' preferably larger than adjacent edge openings 54'. For convenience, opening 52' is rectangular in shape and side openings 54' are triangular in shape thus decreasing the size of the opening from the center towards the edge of each arm. Also in this configuration, the venting jets 50' are positioned near the top of each arm adjacent its connection to the side edge of the crown 12'. In addition, the leading edge of each opening 52' and 54' is reinforced by reinforcing tapes 56' and 58', or the like, which are connected at their ends and intersect with the internal reinforcing tapes 30', as at 60'.

In a typical configuration of FIG. 4, each side 24' of crown 12' and the uppermost edge 26' of the canopy arms 14', 16', 18' and 20' measures 250 inches, thus making each crown section 38' 50 inches per side. The length of each canopy arm from the uppermost edge 26' to the lowermost edge 34' is 132 inches, or approximately 53% of side 24'. Opening 52' is 18 inches high, with a width of 50 inches corresponding to the width of the internal panel 37'. Side openings 54' have a height adjacent opening 52' of 10 inches which tapers to zero at the outer extremity. Finally, the suspension lines in this configuration are also approximately 285 inches in length, or approximately 55% of the canopy cross panel length.

Placing the venting slits 42 or openings 50' in a generally horizontal direction in the upper portion of the canopy arm provides an important feature of the air venting jet system of the present invention. More specifically, the arrangement of the present invention directs the vented mass of air in a direction that is outward and also downward. Directing the air flow which collects underneath the crown section of the canopy in a downwardly and outwardly direction, as opposed to upwardly through the fabric towards the sky, provides propulsive benefits, which tend further to reduce the rate of descent of the canopy. Directing this air flow downwardly and outwardly along the outer surface of the canopy also increases the effective drag area of the parachute by forcing air to flow around the energetic outflow from the vents.

With the openings for the air jet vents 40 formed by slits, such as slits 42, the canopy 10 has a zero geometric porosity because no fabric has been removed from the canopy in forming the slits. Thus, prior to inflation, the slits are not open, and air flow is initially retarded during canopy deployment. However, once the canopy is inflated, the slits take on the shape of openings 41 as shown in FIG. 1 and, by this configuration, provide the propulsive benefits during descent, as described hereinbefore.

Those skilled in the art will appreciate that the benefits of the air venting jets is best achieved by openings which provide highest propulsive benefit in terms of lift without detracting from stability. It has been found that this propulsive benefit is best achieved by generally horizontal slits centrally located in the upper portion of the lateral arms, preferably, 15% to 30% of the arm length down from the attachment of arm to the crown. Depending on the arm length ratio of a particular embodiment, the air jet slits or openings may possibly be placed as far down as the middle of each arm and as far up as where the arms attach to the center section while still obtaining the benefits of the present invention. However, by positioning the openings for the air venting jets in the preferred location, the propulsive benefit of the jets can be maximized.

Furthermore, it has also been found that the horizontal width of the opening 41 across the arms 14, 16, 18 and 20 when the canopy is inflated should be at least twice as long as the height of the opening, and preferably four or five times the height. Hence, the distance from point 62 to point 64 in FIGS. 1 and 2, for example, is at least twice the height of openings 41, when inflated, and preferably at least four or five times the height. Similarly, in the FIG. 4 configuration, the height of the opening 52' when inflated should preferably be less than 20% of the combined width of openings 52' and 54'. It will be appreciated by those skilled in the art that openings 41 can be formed by openings 50' having a positive geometric porosity, or slits 42 having a zero geometric porosity, or a combination of both.

It has further been found that the air venting jets in each lateral arm should preferably be spaced inwardly from the arm edges by a distance of at least 10% of the arm width on each side, and preferably about 20% as shown in the drawings. However, when slits are employed to form all or part of the openings 41, the slits may extend to the outer edges of the arms without departing from the present invention.

Opening shock associated with the opening of the parachute during deployment can be controlled in accordance with the present invention, despite the fact that zero, or near zero, porosity fabric is used for the canopy construction. Control of the opening shock is essential for personnel use and can be controlled in accordance with the present invention by varying the length and width of the lateral arms and length of the suspension lines, without having to resort to extra reefing systems such as sliders or the like. Therefore, in accordance with the present invention, the length of the lateral arms compared to their width is substantially less than in prior art cruciform canopy designs. Similarly, the suspension lines are also significantly shorter than in prior art designs.

As described above and shown in FIGS. 2, 3 and 4 of the drawings, the vertical extent or length of the canopy arms is substantially less than their uppermost width which generally conforms to the adjacent side of the square crown. This is unlike prior art cruciform canopy designs in which the canopy arms typically have a length of 100% to 150% of the crown width. Moreover, it is preferred in the present invention that the length of the canopy arms be less than 75% and, most preferably, on the order of 40–60% of the canopy crown width. In addition, the suspension lines in the present invention are substantially shorter than suspension lines typically used in prior art cruciform parachutes. More specifically, the suspension lines in the parachute of the present invention have a length which is substantially less than the length of the canopy cross panels, measured from the outer edges 34 of opposed canopy arms, tip-to-tip, such as edge 34 on arm 14 to edge 34 on arm 16. Preferably, the suspension lines have a length which is 40%–70% of the canopy cross panel length rather than the 100% to 150% used in the prior art. In addition, the suspension line material is made from polyester, instead of the conventional nylon, to reduce differential stretching.

The foregoing description should be considered as illustrative only of the principles of the invention. Since numerous modifications and changes will readily occur to those skilled in the art, it is not desired to limit the invention to the exact construction and operation shown and described. Accordingly, all suitable modifications and equivalents may be resorted to, falling within the scope of the invention presented.

What is claimed is as follows:

1. A canopy for a cruciform parachute comprising a generally square central section and four lateral arms attached thereto and extending therefrom; said central section and said arms both made from a zero or near zero porosity fabric and said arms having a length less than 75% of the width of the generally square central section; said arms each having an unobstructed opening in the upper portion thereof inwardly of its edges for venting air outwardly and downwardly from underneath said canopy.

2. A canopy in accordance with claim 1 wherein said openings are formed by reinforced slits having approximately zero geometric porosity.

3. A canopy in accordance with claim 1 wherein said openings are air venting jets for directing the air flow from underneath the canopy into a downwardly and outwardly direction outside the canopy.

4. A canopy in accordance with claim 1 wherein said openings are generally horizontally disposed and centrally located on said arms.

5. A canopy in accordance with claim 1 and further including canopy reinforcing tapes on said central section and lateral arms which are continuous and extend from the outer edge of each lateral arm, across the center section and to the outer edge of the opposite lateral arm.

6. A canopy in accordance with claim 5 wherein said openings are horizontally disposed slits having leading edges which are reinforced by reinforcing tapes which are attached substantially perpendicular to said canopy reinforcing tapes on each lateral arm.

7. A cruciform parachute which comprises a canopy having a generally square central section and four lateral arms attached thereto which is made from a zero or near zero porosity fabric, and a series of suspension lines attached at outer edges of said arms for connection to a load deployed with said parachute; each of said arms having an air venting jet formed therein by at least one horizontally disposed split having approximately zero geometric porosity positioned in the upper half of said arm for directing air flow from underneath the canopy in a downwardly and outwardly direction.

8. A canopy in accordance with claim 7 wherein each air venting jet is located between 15% and 30% of an arms length away from attachment of the arms to central section.

9. A cruciform parachute in accordance with claim 7 and further including canopy reinforcing tapes which are continuous and extend from the outer edge of each lateral arm of said canopy, across the center section and to the outer edge of the opposite lateral arm.

10. A cruciform parachute in accordance with claim 7 wherein said air venting jets are located where a tangent line intersecting said arms is about 45° from the vertical axis of the parachute.

11. A cruciform parachute in accordance with claim 7 wherein said lateral arms taper from their attachment to the central section to an outer edge.

12. A cruciform parachute in accordance with claim 11 wherein said lateral arms comprise a series of at least three generally trapezoidal panels having a shape which substantially matches the convergence of the suspension lines to a common confluence point.

13. A cruciform parachute in accordance with claim 7 wherein said lateral arms have a length less than 75% of the width of said central section.

14. A cruciform parachute in accordance with claim 13 wherein the length of said lateral arms is on the order of 40%–60% of the width of said arms where attached to a side of said square central section.

15. A cruciform parachute in accordance with claim 7 wherein said suspension lines have a length which is 40%–60% of the length of the canopy from outer edges of opposed canopy arms.

16. A cruciform parachute which comprises a one piece canopy having a generally square center section and four lateral arms attached thereto with outer edges defining the ends thereof and canopy reinforcing tapes extending from the outer edge of each lateral arm, across the center section and to the outer edge of the opposite lateral arm, and suspension lines connected to said canopy reinforcing tapes at the outer edges of the lateral arms; said lateral arms each having at least one air venting jet for directing air flow from underneath the canopy in a downwardly and outwardly direction outside the canopy; said air venting jets located where a tangent line intersecting said arms is about 45° from the vertical axis of the parachute.

17. A cruciform parachute in accordance with claim 16 wherein said generally square center section is enlarged by removing a small triangular section from each corner adjacent the attachment of the lateral arms to the center section.

18. A cruciform parachute in accordance with claim 16 wherein said air venting jets are formed by horizontally disposed slits across the central portion of said arms.

19. A cruciform parachute in accordance with claim 18 wherein said horizontally disposed slits have leading edges which are reinforced by reinforcing tapes which are attached substantially perpendicular to canopy reinforcing tapes extending across said center section and said lateral arms.

20. A cruciform parachute in accordance with claim 16 wherein said lateral arms have a length which is less than 75% of the width of said center section.

* * * * *